Nov. 3, 1931.  A. LANG  1,830,739
AUTOMATIC RELEASE IMPLEMENT HITCH
Filed Jan. 30, 1930  2 Sheets-Sheet 1

INVENTOR.
Andrew Lang
BY
ATTORNEYS.

Nov. 3, 1931.  A. LANG  1,830,739

AUTOMATIC RELEASE IMPLEMENT HITCH

Filed Jan. 30, 1930  2 Sheets-Sheet 2

INVENTOR.
Andrew Lang
BY
ATTORNEYS.

Patented Nov. 3, 1931

1,830,739

UNITED STATES PATENT OFFICE

ANDREW LANG, OF MOBRIDGE, SOUTH DAKOTA, ASSIGNOR OF ONE-HALF TO CARL GUSTAV FRISTAD, OF MANDAN, NORTH DAKOTA

AUTOMATIC RELEASE IMPLEMENT HITCH

Application filed January 30, 1930. Serial No. 424,668.

The present invention relates to tractor hitches, and has for an object to provide an automatic release for implements which are operated in back of a plow, the automatic release device being associated with the automatic plow release in such manner as to offset side draft of the plow and at the same time to release the implements simultaneously with the release of the plow from the tractor under such conditions which impose an abnormal draft upon the hitch.

Another object of the invention is to provide an automatic release of this character which may be easily applied to the ordinary automatic release plow hitch without changing the construction or adjustment thereof and at the same time is maintained in coupled relation to the plow hitch and is released automatically upon the release of the plow hitch so that both the plow and the implements are simultaneously disconnected from the tractor.

The invention further aims at the provision of a hitch of this character which while disposed directly between the implements behind the plow and the tractor to the exclusion of the plow, is so associated and connected to the plow as to properly maintain the implements behind the plow during all movements of the latter, and which is automatically released simultaneously with the release of the plow from the tractor.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
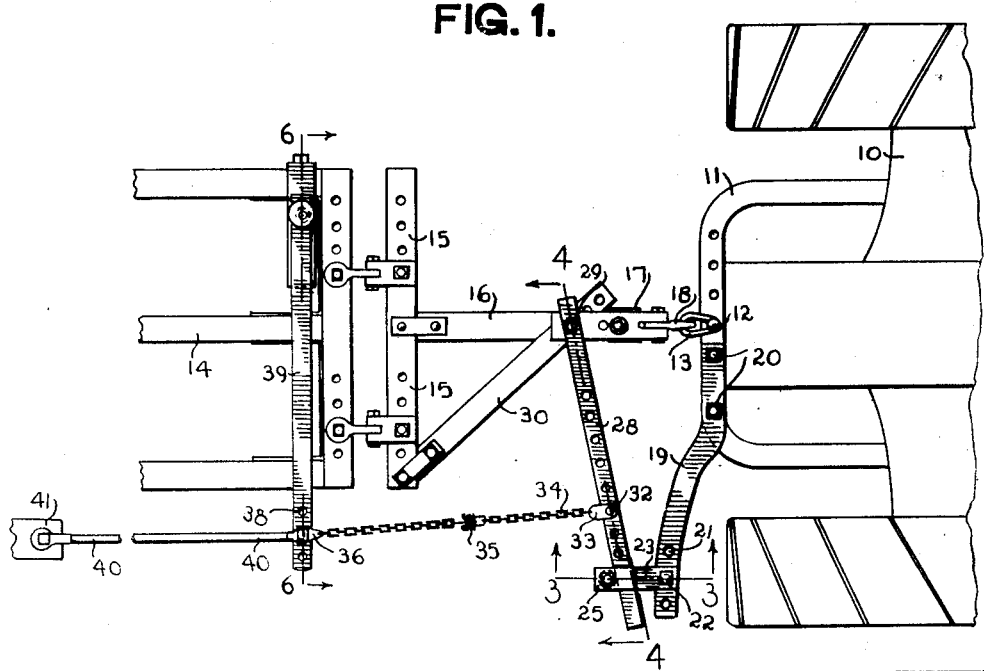
Figure 1 is a fragmentary top plan view of an automatic hitch constructed according to the present invention and shown in applied position with relation to a tractor and a plow frame and with the parts coupled together.

Referring to the drawings, 10 designates a tractor of any approved type provided at its rear end with a draw bar 11 carrying a coupling pin 12 to which is connected a ring 13. The plow 14 is provided with a draft device 15 including a tongue 16 upon which is mounted a conventional type of hitch release 17 including a hook 18 adapted to engage in the ring 13. This construction is conventional and the automatic release device 17 is adapted to operate for releasing the hook 18 from the ring 13 when the plow 14 meets obstructions tending to stop the plow and increasing the draft on the tongue 16 beyond a predetermined fixed pressure.

The present invention embodies an attachment which operates substantially in parallel relation with the tongue 16 and adjacent parts for independently coupling implements, such as packers, drills, harrows and the like for operation behind the plow 14, directly to the tractor draw bar 11 to offset any side draft or additional draft pressure upon or through the frame 14. To this end, the present invention provides a bracket arm 19 which is adjustably secured by bolts 20 or the like to the draft bar 11 of the tractor, the bracket 19 extending laterally outward from the tractor 10 and being arched rearwardly to give ample clearance to the adjacent rear wheel of the tractor.

The bracket 19 is in the form of a flat bar, and at its outer end portion is provided with a series of spaced apart openings 21 through which is selectively positioned a coupling bolt 22 which has its upper head portion countersunk in the upper face of a link 23, the latter extending rearwardly from the bracket 19. The rear end of the link 23 carries a vertically disposed bolt 24 beneath the head of which is disposed a keeper plate 25 which is spaced above the link 23 and held in overhanging relation therewith by means of a spacing sleeve 26 surrounding the intermediate portion of the bolt 24 and adapted to be clamped or bound between the link 23 and the keeper plate 25 when the bolt is tightened. The sleeve 26 provides a bearing for an anti-friction roller 27 adapted to receive the outer end of an equalizing bar 28 adapted to have longitudinal movement beneath the keeper plate incident to the relative side sway between the plow draft device 15 and the tractor 10.

The equalizing bar 28 is pivotally mounted at its inner end upon a bolt 29 which is secured through the tongue 16 rearwardly of the automatic release device 17, and through the forward end of a diagonal brace 30 which extends backwardly and outwardly from the side of the tongue 16 from which the equalizing bar 28 extends.

The equalizing bar 28 is provided intermediate its ends with a series of longitudinally spaced apart openings 31 adapted to selectively receive therein a coupling pin 32 which is carried on a yoke 33 to which is secured the forward end of a chain 34. The chain 34 has an automatic compensation device 35 which may be in the form of a coil spring with connectors arranged in overlapping relation and secured to the remote ends of the spring for the purpose of yielding incident to the sudden takeup of loads through the chain 34. The rear end of the chain 34 is connected to an eye piece 36 mounted upon a bolt 37 which is selectively positioned in openings 38 formed in the outer free end portions of a spacing bar 39 mounted on the plow frame 14. The bolt 37 provides the forward pivotal connection of a draft bar 40 which extends rearwardly along one side of the plow frame 14 and is adapted for connection at its rear end to the tongue or frame 41 of the implement adapted to be drawn or operated in rear of the plow frame 14.

The spacing bar 39 is adapted to extend across the forward end portion of the plow frame 14 and at its inner end is pivotally mounted upon a bolt 42 which extends upwardly through a bracket arm 43 and through the inner end of the spacing bar 39.

The bolt 42 may have a bushing 44 thereabout providing a spacer for a retaining washer 45 which overlaps the inner end of the spacing bar 39 and is adapted to hold the bar from rising from the bolt, the bushing 44 providing a cylindrical bearing surface of suitable size to support the spacing bar incident to the wear and tear imposed thereon.

Figure 6:
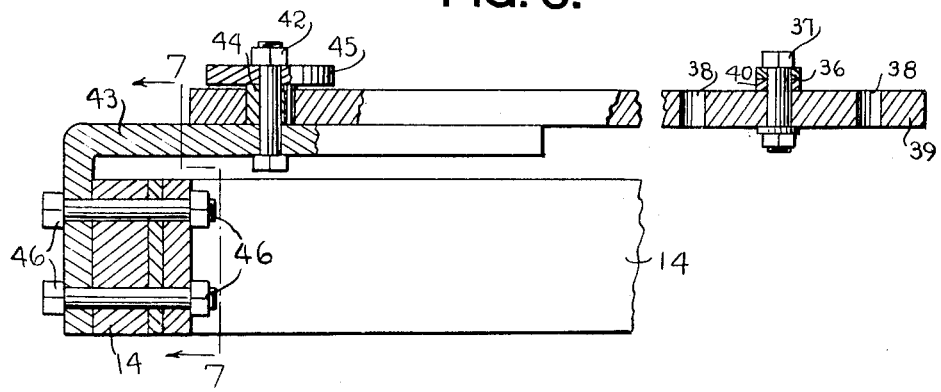
Figure 6 is an enlarged fragmentary transverse section taken on the line 6—6 of Figure 1 through the plow frame, showing the guiding connection of the improved hitch mounted thereon.
Figure 7:
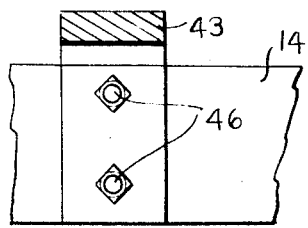
Figure 7 is a fragmentary transverse section taken through the same.

The bracket arm 43 is turned down at the outer side of the plow frame 14 and is secured thereto by clamp bolts 46 or the like which extend through the frame 14 and the adjacent parts thereof as shown in Figure 6.

When the tractor 10 is in motion and drawing the plow 12 the tongue 16 provides the connection between the tractor and the plow and is permitted to swing upon the coupling pin 12 to assume various angular relations in the line of draft. During the swinging movements of the tongue 16 the equalizing bar 28 is swung therewith and the outer end thereof slides beneath the keeper plate 25, the roller 27 reducing the frictional contact of the bar 28 and thus offsetting any retarding movement in the action of the tongue 16. The implement or device, represented at 41, is drawn directly through the equalizing bar 28 by the chain 34, the draft being taken up through the link 23 and the bracket arm 19.

The spacing bar 39 serves merely to hold the chain 34 and the draft bar 40 laterally of the plow frame 14 and to insure that there is a definite and predetermined relation between the implement 41 and the plow frame 14 at all positions of the plow in the line of draft. The implement 41 is thus always in correct position behind the plow.

Figure 2:
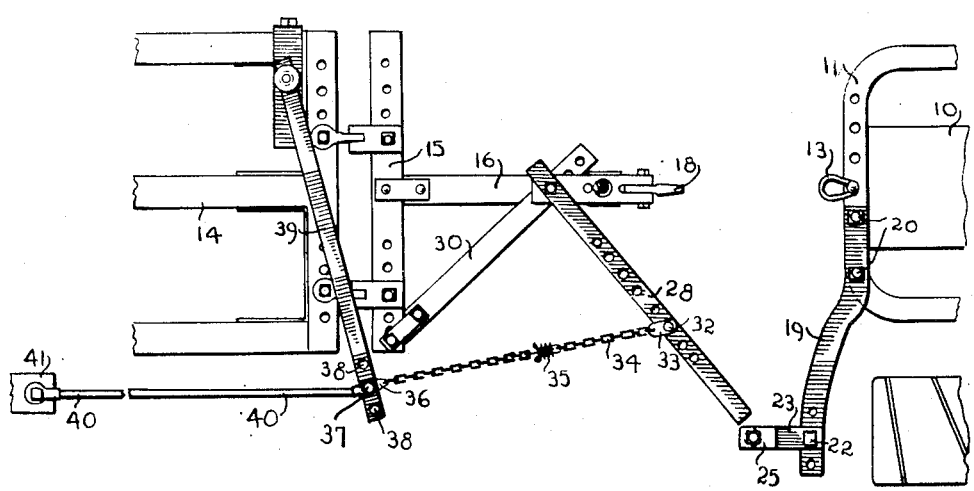
Figure 2 is a like view showing the parts released.
Figure 3:
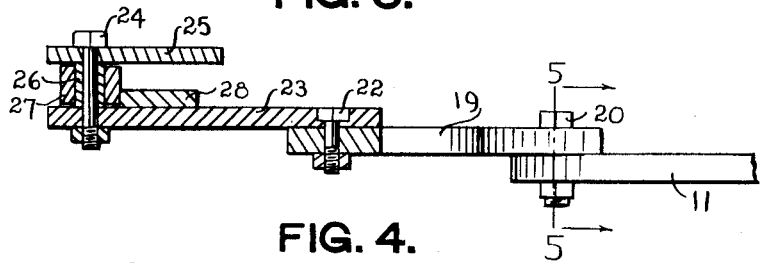
Figure 3 is a longitudinal section taken through one side of the automatic hitch substantially on the line 3—3 of Figure 1.
Figure 4:
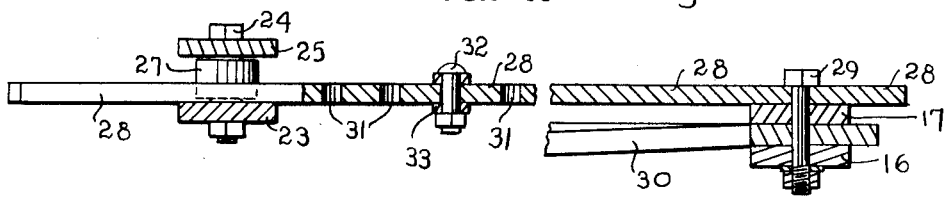
Figure 4 is a transverse section taken lengthwise through the equalizing bar and substantially on the line 4—4 of Figure 1.
Figure 5:
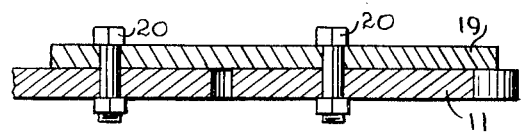
Figure 5 is a detail enlarged section taken through the bracket and draw bar connection.

When an excessive pressure is exerted in the line of draft upon the tongue 16, the automatic release device 17 functions to release the hook 18 from the ring 19, as shown in Figure 2, and such operation swings the equalizing bar 28 forwardly and carries the pivoted end thereof rearwardly with respect to the tractor 10 so that the free end of the equalizing bar 28 slides inwardly and from beneath the keeper plate 25, thus freeing the implement 41 from its draft bracket 19.

It is thus seen that the implement 41 is drawn directly from the tractor 10 and is held by the spacing bar 39 in correct position relatively to the plow 14 and is simultaneously and automatically uncoupled from the tractor 10 when the plow 14 is released therefrom. While the attachment is dependent upon and controlled by the operations and movements of the hitch between the plow and the tractor, it does not in any way interfere with the normal operation of the plow hitch, but in the event an obstruction in the path of the implement 41, causes this implement to halt, the consequent abnormal draft upon the hitch would release the plow from the tractor in the manner heretofore stated.

It is obvious that various changes and modifications may be made in the details of construction and design of the above specifically described embodiment of this invention without departing from the spirit thereof, such changes and modifications being restricted only by the scope of the following claims.

What is claimed is:—

1. In combination with a tractor, a trailing unit and an automatically releasable hitch between the tractor and the trailing unit, an implement draft connection adjacent the trailing unit for drawing an implement for co-operation with the trailing unit, means for maintaining the draft connection in predetermined relation adjacent the trailing unit, and a releasable device arranged between the draft connection and the tractor to the exclusion of the automatically releasable hitch for the trailing unit and connected thereto for simultaneous release therewith.

2. In combination with a tractor, a plow and an automatically releasable hitch between the tractor and the plow, a bracket mounted on one side of the tractor and having a keeper device at its outer end, an equalizing bar pivotally mounted on the plow hitch at one end and slidably mounted at its other end in the keeper device, a flexible draft device adjustably mounted on said equalizing bar and extending rearwardly therefrom, a spacing bar pivotally mounted upon the plow and connected to said draft device for maintaining the latter in predetermined relation at the side of the plow, said draft device adapted for connection with an implement co-operatively positioned with respect to the plow.

3. An implement draft device for use with a tractor and a plow connected to the tractor by an automatically releasable hitch, comprising a flexible draft connector, an equalizing bar adjustably connected to the forward end of the connector, a bracket carried by the tractor slidably engaging one end of the equalizing bar, means for pivotally mounting the opposite end of the equalizing bar on said plow hitch and admitting of the release of the equalizing bar from the bracket when said plow hitch is released, and a spacing member adapted to be mounted on the plow and engaging said flexible connector to maintain the same in definite relation with respect to the plow.

4. A hitch for implements adapted to be drawn behind a plow which is driven through an automatically releasable hitch by a tractor, comprising a flexible connector adapted for attachment to the implement at the rear end of the connector, an equalizing bar adjustably connected to the forward end of the connector, a draft bracket adapted to be mounted on the tractor and slidably engaging one end of the draft bar, means for pivotally connecting the other end of the draft bar to the plow draft connection, and a spacing bar carried by the plow and engaging said flexible connector to maintain the same in a definite relation at one side of the plow.

5. An implement hitch for application to an automatically releasable hitch between a tractor and a plow, comprising an equalizing bar adapted for pivotal mounting at one end upon the plow hitch, a draft bracket adapted to be mounted on a tractor and slidably engaging the opposite end of the equalizing bar and admitting of the escape of the bar from the bracket when the plow hitch is uncoupled, a draft connector adjustably mounted on the equalizing bar and extending rearwardly for attachment to an implement behind the plow, and a spacing bar pivotally mounted upon the plow and extending laterally therefrom and connected to said draft connector for maintaining the same in a definite predetermined relation with respect to the plow to insure the correct draft of the implement behind the plow.

6. An auxiliary releasable hitch for vehicles comprising a draft connector, an equalizing member connected therewith and with one of the vehicles, means at one end of said equalizing member for releasably holding said equalizing member in connection with another of the vehicles, and admitting of the release of the equalizing member when the main hitch is released, and a spacing member carried by the last mentioned vehicle and engaging the draft connector to maintain the same in definite relation with respect to the vehicles.

7. In combination with a traction device, a main trailing vehicle and auxiliary trailing vehicle, a main automatically releasable hitch between said traction device and said main trailing vehicle, of a member adapted for attachment to said traction device, a keeper plate on said member, an equalization bar pivotally mounted at one end to said main trailing vehicle and slidably mounted at its other end in the keeper plate, a spacing bar pivotally mounted upon said main trailing vehicle, a draft device adjustably mounted upon said equalization bar and extending rearwardly therefrom for adjustable connection to said spacing bar, said draft device adapted for connection with said auxiliary trailing vehicle cooperatively positioned with respect to the main trailing vehicle.

8. In combination with a traction vehicle, a main and an auxiliary trailing vehicle, a main automatically releasable hitch between said traction vehicle and said main trailing vehicle, of a bracket, an equalization member, and adjustable draft connector and a spacing member, said equalization member being pivotally connected to said main trailing vehicle and slidably releasable from said bracket upon release of the main automatically releasable hitch, said adjustable draft connector being positioned between said equalization member and said spacing member, said spacing member adapted for mounting upon said main trailing vehicle for adjustable connection with said auxiliary trailing vehicle to maintain the latter in a predetermined relation with respect to said main trailing vehicle.

ANDREW LANG.